June 28, 1949. W. H. WHEELER ET AL 2,474,605
LIQUID DIFFUSER
Filed Oct. 26, 1948 5 Sheets-Sheet 5
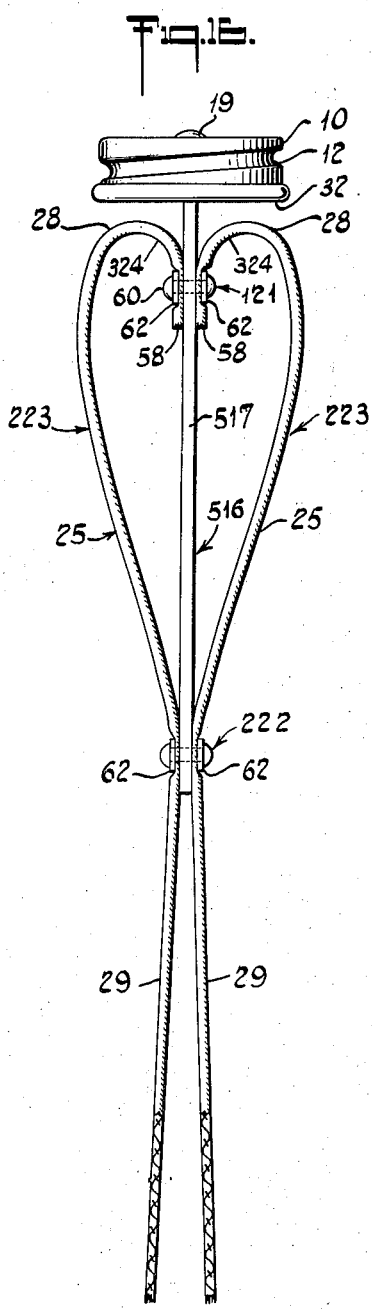
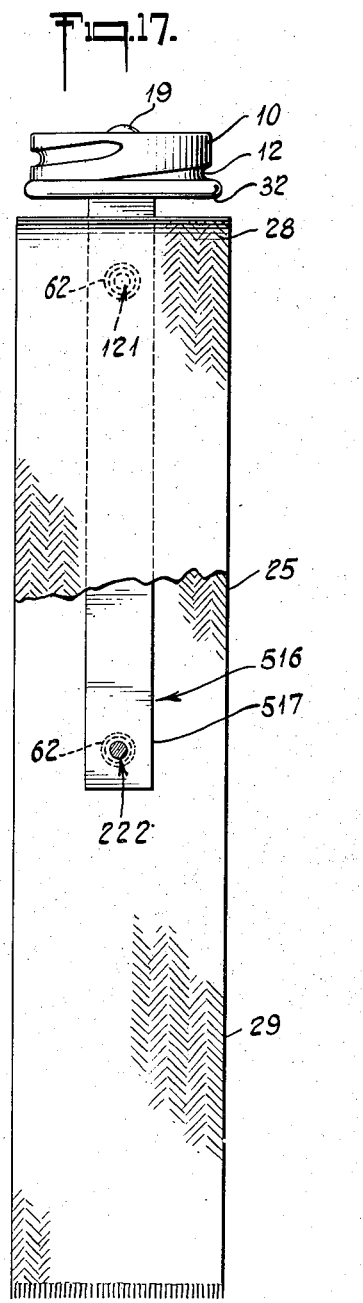
INVENTORS
WILLIAM H. WHEELER.
LEONARD B. WAMNES.
BY
Watson, Bristol, Johnson & Leavenworth
ATTORNEYS Patented June 28, 1949

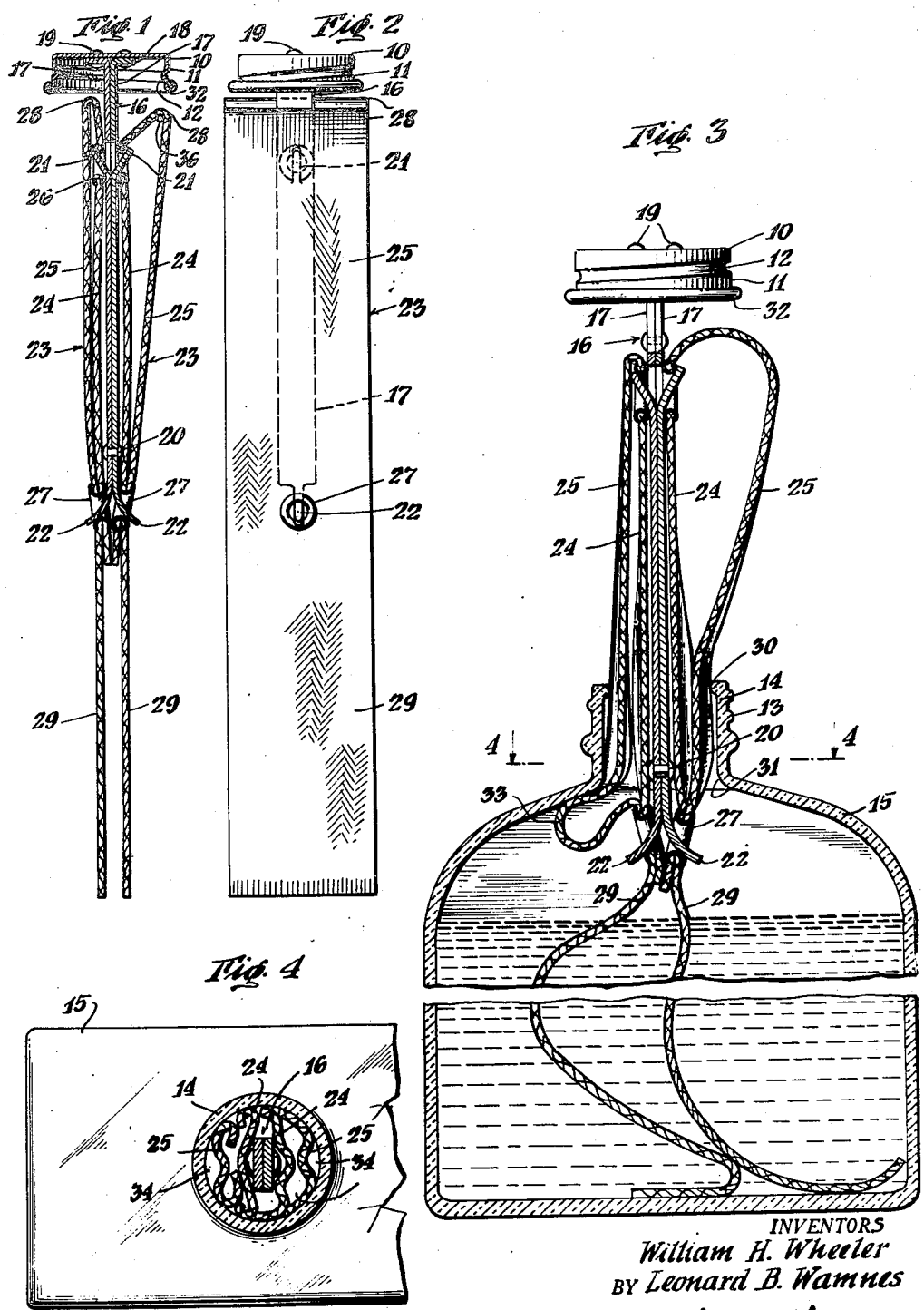

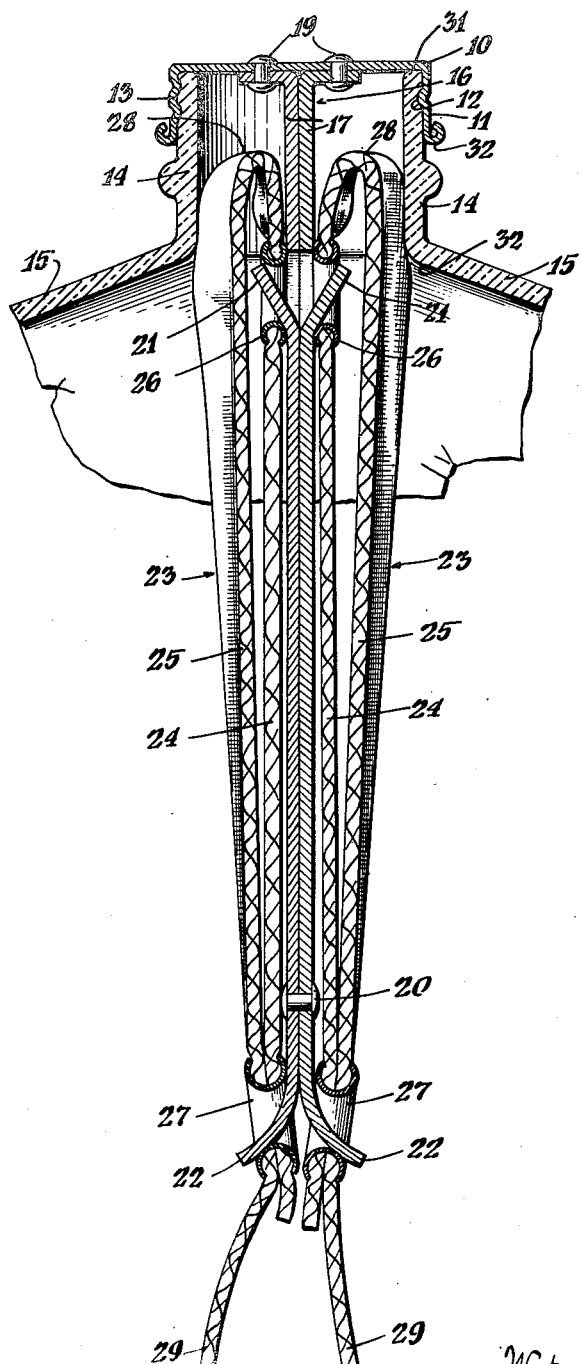
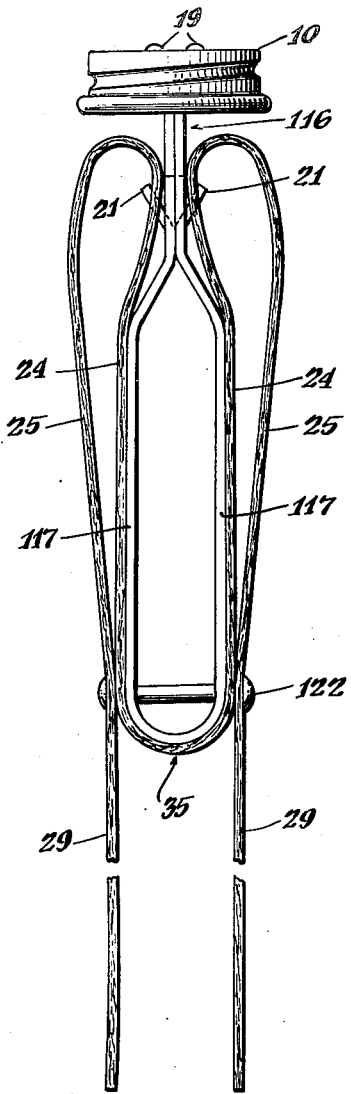

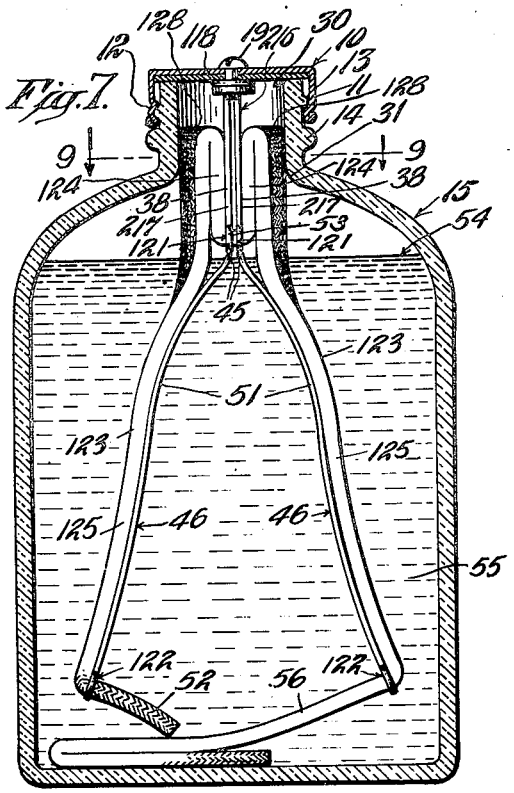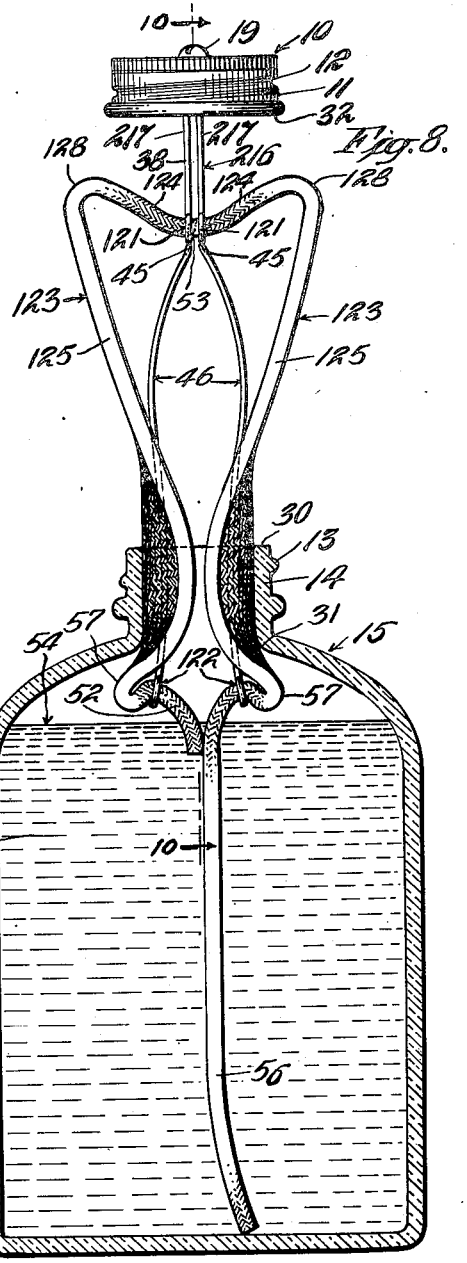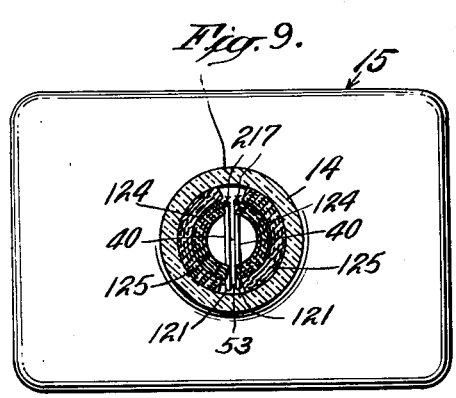

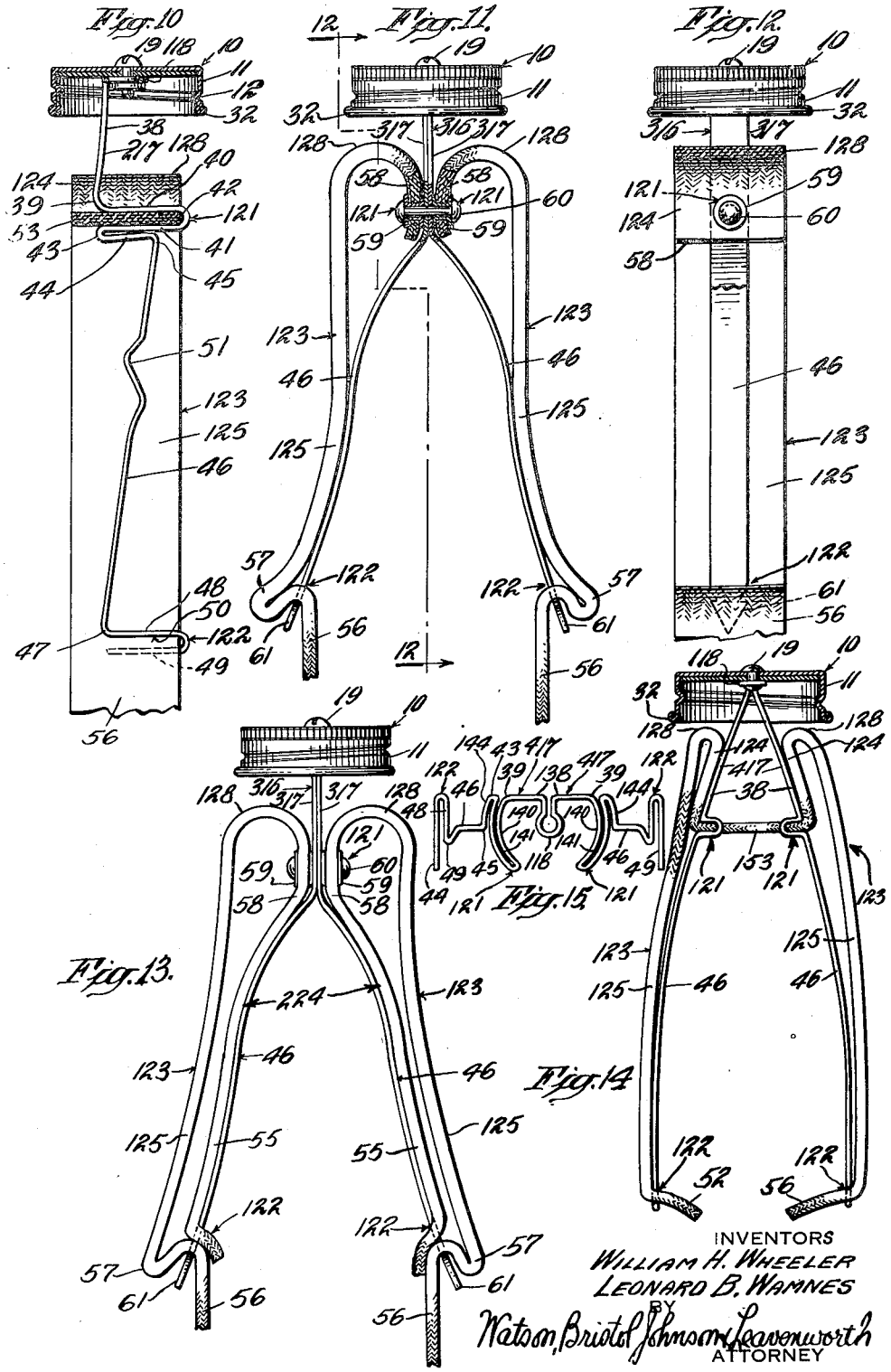

2,474,605

UNITED STATES PATENT OFFICE 2,474,605

LIQUID DIFFUSER

William H. Wheeler, New York, N. Y., and Leonard B. Wamnes, Aberdeen, Miss., assignors to Airkem, Inc., New York, N. Y., a corporation of New York Application October 26, 1948, Serial No. 56,648

14 Claims. (Cl. 299—20)

1

The present invention relates to liquid diffusers and, more particularly, to such devices adapted to disperse vapors from liquids into the atmosphere by controlled evaporation; the present application being a continuation-in-part of our co-pending abandoned applications Serial No. 556,704, filed October 2, 1944, and Serial No. 608,470, filed August 2, 1945.

A general object of the invention is the provision of such liquid diffuser which is readily and economically constructed and assembled, easily manually manipulated to obtain quite precise adjustment or control of the rate of evaporation of contained liquid material, provides for automatic manipulation to efficiently diffusive position of an evaporative body (e. g. a body of porous material which when saturated with liquid will permit vaporization and diffusion of such liquid therefrom in vapor phase into the surrounding atmosphere) as such body and support means are manually withdrawn from the liquid-containing vessel, permits ready opening and closing of the vessel, and which is adapted to efficient dispensation of evaporable liquids (liquid capable of being evaporated) such as air fresheners from vessels such as bottles.

A more specific object of the invention is to provide such a device characterized by a bottle, or the like, for holding a body of evaporable liquid and withdrawable stem means supporting evaporative body means, such as wicking, or the like, in such manner as to permit ready adjustment during withdrawal to any of a plurality of desired positions there to remain for exposure of a predetermined length of evaporative body for efficiently controlled rate of evaporation, the stem means with the evaporative body carried thereby being readily returnable to the bottle to permit effective closure of the latter when termination of diffusion is desired.

Another object of the invention is to provide in such device such stem and evaporative body assembly as will assure operation of the latter in a manner so that it may efficiently serve as a limiting stop in the withdrawal of the assembly from the vessel, and, during withdrawal, make possible either manual or automatic flaring of the evaporative body means to insure effective exposure of surfaces for efficient diffusion of vapor into the surrounding atmosphere.

Still another object of the invention is to provide structural embodiments of the device which are readily constructed and allow efficient use and operation thereof.

2

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 1 is an elevational section to reduced scale of the closure, supported stem, evaporator and wicking to be fitted to a vessel in accordance with one embodiment of the present invention;

Fig. 2 is a side elevational view of the structure shown in Fig. 1;

Fig. 3 is an elevational section, with parts broken away, of the structure shown in Figs. 1 and 2, together with the liquid-containing vessel showing the stem and associated wicking supported in diffusing position in the neck of the liquid-containing vessel and with the dual wicking units differently manipulated;

Fig. 4 is a sectional view, with parts broken away, taken on line 4—4 of Fig. 3;

Fig. 5 is an elevational section to enlarged scale, with parts broken away, of the structure shown in Fig. 3, showing the cap and structure supported thereby in vessel closing position;

Fig. 6 is an elevational view to reduced scale of a modified form of the cap, stem and wicking of the invention adapted for use with vessels of larger capacity than those to be employed with the embodiments of Figs. 1 to 5, inclusive;

Fig. 7 is an elevational view of another embodiment of the present invention with the bottle and closure shown in sectional elevation and the stem means and evaporative body means supported thereby shown in side elevation, all parts being depicted in their relative positions when the bottle is closed;

Fig. 8 is a view similar to that of Fig. 7 and of the structure shown therein, but with the closure shown in side elevation and with the stem and evaporative body means withdrawn from the bottle to a diffusing position;

Fig. 9 is a sectional view taken on line 9—9 of Fig. 7;

Fig. 10 is a sectional view of the bottle closure, stem and evaporative body means of Figs. 7 to 9 inclusive, taken along line 10—10 of Fig. 8;

Fig. 11 is an elevational view, with parts in section and broken away, of a modified form of stem and evaporative body means of the invention, showing the same mounted to and suspended from a bottle closure or cap;

Fig. 12 is a view taken along line 12—12 of Fig. 11, showing parts in section and elevation and parts broken away;

Fig. 13 is a view similar to Fig. 11, but with sectioning omitted, of a further modification of the present invention;

Fig. 14 is a view similar to Fig. 7, but with the bottle omitted and parts broken away, of still another form of the invention;

Fig. 15 is a top plan view of the stem means of the structure shown in Fig. 14;

Fig. 16 is a view similar to Fig. 6 of a further modified form of cap, stem means and evaporative body means or wicking of the invention; and Fig. 17 is a side elevational view, with parts broken away and in section, of the structure shown in Fig. 16.

Referring to the drawings, like numerals identify like parts throughout. A vessel closure 10, which may be a stopper or a cap and the like as desired, preferably comprises a cap having a skirt 11 provided with a screw thread 12 adapted to engage with external threads 13 on a neck 14 of a vessel such as a bottle 15. The closure or cap 10 is provided with elongated stem means 16 mounted thereto and suspended therefrom in any suitable manner. As shown in Figs. 1 and 5, the stem 16 may comprise two somewhat similar pieces 17, 17 each of which is provided with a flange 18 secured by a rivet 19 to the cap 10. The two stem pieces 17, 17 may be secured together in any suitable manner such as by one or more rivets 20.

Each stem piece 17 is provided with a pair of longitudinally spaced-apart anchoring means which may comprise a pair of bolts, a pair of rivets or the like, but preferably comprise a pair of ears or fingers 21 and 22. The top ear or finger 21 may be provided by striking out a portion of the stock of the stem piece 17, and the ear or finger 22 may be formed by reducing in width the bottom end of the stem piece 17 and bending the reduced portion laterally.

The stem 16 is equipped with an evaporative body or diffuser for liquid of any type such as an air freshener, e. g. the product of Paschal U. S. Patent No. 2,326,672 of August 10, 1943, and this evaporative body may, in accordance with the present invention, comprise a strip 23 of porous material, such as wicking, looped back upon itself to provide an inner ply 24 and an outer ply 25. The inner ply 24 preferably is provided with any suitable means to be engaged by the anchoring means or fingers 21 and 22, such as a top eyelet 26 and a bottom eyelet 27. The outer ply 25 is not anchored to the anchoring means or finger 21 other than by the top portion of inner ply 24 which is joined thereto at the top of the loop, such as at 28, but it is preferably provided with any suitable means adapted to engage the bottom finger 22. Such means for engaging the finger 22 may be the eyelet 27 which preferably extends through both the inner and outer plies 24 and 25 to connect them together.

It will be noted from Fig. 1 and other figures that the top of the loop at 28 is extended beyond or above the top anchoring means or finger 21 by a minor portion of the inner ply 24 and a major portion of the latter extends between the fingers 21 and 22 with relatively no slackness, thereby assuring that the outer ply 25, extending from the lower finger 22 up to the loop top 28, and the upper minor portion of the inner ply from the loop top down to the top finger 21 provide together a loose strip of wicking which is longer than the lower major portion of the inner ply extending tautly between fingers 21 and 22, so that the resulting loose strip hangs loosely between the anchoring fingers 21 and 22. Of course, since woven wicking shrinks longitudinally when wetted, it is understood that the distance between the eyelets 26 and 27 in dry wicking preferably should be slightly greater than the distance between the roots of the fingers 21 and 22 to assure ease in engaging the eyelets over the fingers, but that this difference preferably is approximately equal to the amount of foreshortening of the inner ply when wetted, but less than the distance between the ends of fingers 21 and 22 so that when parts are assembled the wicking may be stretched to engage the eyelets over the fingers and when released will remain in mounted position though dry.

The evaporative body 23 is preferably, though not necessarily, suitably associated or equipped with a wick to draw liquid outwardly from within the vessel to the evaporative body. Such wick may be provided by extending the bottom ends of either one or both of the inner and outer plies 24 and 25. Since it has been found that a single wick is sufficient for this purpose, an economy of wicking dictates the extension of only one of the two plies. Preferably this extension is provided only for the outer ply 25 to form a wick 29 which covers the bottom end of the inner ply to aid in threading the wick assembly through the neck of the bottle. The wick extension 29 preferably is of sufficient length to reach to the bottom of the bottle when the stem and wick assembly are withdrawn through the bottle neck a maximum distance of adjustment at which maximum rate of evaporation or diffusion into the surrounding atmosphere of evaporable liquid may be had. But, of course, the device will operate in the absence of depending wick 29 since when the wicking assembly is lowered into the bottle it will be wetted by contained liquid either by immersion or when the bottle is shaken.

As shown in the drawings, the wicking assembly just described is preferably duplicated on opposite sides of the stem means, but it will be understood that in so far as the operative and novel features of a wicking assembly are concerned, this may comprise a single inner ply 24 and a single outer ply 25 mounted on one side of the stem means.

The structure shown in Fig. 3 is drawn substantially to scale with the bottle adapted to contain about a pint of liquid. This bottle 15 is provided with the elongated neck 14 terminating at 30 in a mouth and with the neck provided at 31 with an internal end or throat. As a result it will be understood that when the wick 29 is fed down into the bottle 15 and the stem 16 lowered the evaporative body 23 will pass down through the neck 14 until the cap 10 is engaged upon the neck 14 to close the bottle. Such closure operation is to be had with ease since a preferred embodiment of the diffuser of the present invention is designed for periodic use with the bottle closed between periods of diffusion. Thus the loop top 28 advisedly is limited in its extension beyond the anchoring means 21 to such an extent as to tend to avoid being caught at any point between the mouth of the bottle and the edge 32 of the skirt 11 of the cap. Should wicking be used which is considerably narrower than the neck 14, the top of the loop 28 might well extend to the vicinity of the edge 32 of the cap skirt 11. However, it is preferred to use wicking which is wider than the neck diameter as is suggested in Fig. 2. Accordingly, the outer edges of the loop top 28 may present such a problem if the loop is extended entirely to the edge 32 of the cap. This is avoided by foreshortening the top of the loop 28 a short distance such as is suggested in Fig. 1, so that, regardless of the relative dimensions of the structure, the length of that portion of the inner ply 24 above the top anchoring means 21 is such that the distance between the top anchoring means and any point on the top of the loop, such as at one of its outer corners, is substantially no longer than the distance between that anchoring means and any point on the bottom edge 32 of the cap skirt 11.

The loose strip of wicking, comprising the upper minor portion of the inner ply 24 and the outer ply 25, is made longer than the lower major portion of the inner ply 24 tautly extending between the anchoring means 21 and 22 for at least two reasons. One of these reasons is that it will serve, by jamming, as a stop to limit the withdrawal of the stem 16 from the neck 14 of the bottle. This condition is graphically suggested in Fig. 3, wherein it is shown that by withdrawal of the stem 16 the wetted outer ply 25 will drag along the inner surface of the neck 14 to produce a loop 33 which will eventually be jammed against the inner surface of the bottle 15 at the throat 31. In the structure shown in Fig. 3 the stem 16 has not quite been withdrawn to completely tight jamming and final limiting position. This jamming for limiting withdrawal of the stem and evaporative body from the neck 14 may be provided by the two wicking assemblies on opposite sides of the stem, or such purpose may be efficiently served by one of the two wicking assemblies, since it may be desired to increase the rate of diffusion provided by the maximum exposure of the evaporative body 23 beyond the mouth 30 when the stem is withdrawn to its final limited position. In such case a greater rate of diffusion may be attained by engaging an instrument such as a finger between the inner and outer plies 24 and 25 and looping the loose strip of wicking, comprising the upper minor portion of the inner ply and the outer ply, outwardly in a lateral direction as is proposed with respect to the right-hand wicking assembly in Fig. 3 for more complete exposure of the surfaces of the wicking to the surrounding atmosphere. Of course, it will be understood that such an operation can also be had with respect to the left-hand wicking assembly of Fig. 3, and that retention of the assembly in the neck of the bottle be had by providing enough wicking so that it will be crowded within the neck 14, thus to hold the wicking assembly in any selected one of a number of positions of adjustment in the bottle neck for exposure of the desired amount of area of the evaporative body 23.

As previously indicated in connection with Fig. 2, the wicking is preferably considerably wider than the diameter of the neck 14 of the bottle 15. This, as is indicated in Fig. 4, will cause the wicking to be provided with longitudinally extending folds with parts thereof lapping back and forth to assure, particularly when wet, a fairly secure fitting or crowding of the evaporative body within the bottle neck so that the stem and evaporative body assembly may be held in any one of the desired number of different positions. Further, such folding, as is shown in Fig. 4, assures the provision of venting passageways such as 34—34 to prevent vapor lock within the bottle as liquid is withdrawn therefrom by the wicking to be diffused by the evaporative body. Proper dimensioning of parts and these passageways so provided by the longitudinal folding, assure that as the stem and evaporative body are returned to within the bottle during closure with resultant squeezing of the wicking as it is slid down through the neck 14, the liquid squeezed out from the wicking will be returned to within the bottle rather than drip down the outside of the bottle.

As has been indicated above, there is a practical limit to the extent that the top of the loop 28 extends above the top anchoring means 21. There is also a practical limit to the extent of foreshortening the loop 28. As will be obvious from an inspection of Fig. 5, regardless of the structure of the stem and wicking assembly and anchorage thereof, the loop tops 28, 28 should not be located down along the stem means 16 to a point below the throat or inward end 31 of the neck 14. If such a condition did exist the wicking would tend to become jammed at the throat 31 of the neck 14 as one attempted to withdraw the stem from the bottle for desired diffusion. With the loop tops 28, 28 located within the neck 14 between mouth 30 and throat 31 when the cap 10 is in vessel-closing position, any such withdrawal-preventing jamming is effectively avoided.

As shown in Fig. 6, the wicking assemblies on opposite sides of the stem may be duplicated and formed from one strip of wicking so that the two inner plies 24, 24 are connected together at their bottom ends such as at 35.

The structure which is shown in Fig. 6 to reduced scale proposes a modified form of stem means 116 with the two legs thereof 117, 117 below the anchoring fingers 21, 21 separated or spaced apart to accommodate this structure to a larger sized bottle or one which has a neck of greater diameter while retaining the desired features of compression of the wicking against the inner walls of the neck 14, or crowding of the stem and wicking assembly in the neck, to assure effective holding of the evaporative body in any one of a number of the desired positions of adjustment. In the structure shown in Fig. 6 the two legs 117, 117 are shown made integral at the bottom ends thereof such as in the vicinity of the point 35 and the inner and outer plies 24, 24 and 25, 25 of wicking are shown anchored in the vicinity of the bottom of the stem by means of a through rivet or bolt 122.

In operation of an embodiment of the present invention, such as that proposed in Figs. 1 to 5 inclusive, a bottle provided with liquid to be diffused may be effectively closed by the cap 10 with the stem means thereof and the supported evaporative body in the position proposed in Fig. 5. When diffusion of the contained liquid is desired the cap 10 may be rotated to disengage the thread 12 thereof from the thread 13 on the bottle neck 14, after which the cap may be employed to withdraw the stem means 16 through the neck 14 for exposure of a desired length of evaporative body 23. Crowding of the wick in the neck 14 is such as to assure holding the stem and the evaporative body in the selected position. In other words the cross-sectional bulk and dimensions and configuration of the stem and wicking assembly are such or bear such relation to the cross-sectional area of the bottle mouth and/or neck as to make the former self-supporting in the latter, particularly when the wicking is wet. Liquid will be drawn up from the bottle by the wicks 28, 29 to the outer plies 25, 25 and will also be transferred to the inner plies 24, 24 by face-to-face contact. As such liquid is drawn up and evaporated into the surrounding atmosphere it is replaced in the bottle by air taken down through the venting passages 34—34. Complete withdrawal or limiting stop of the stem 16 and the evaporative body supported thereon is assured by the formation of the jamming loop or loops 33. However, should it ever be desired completely to remove the assembly from the bottle, jamming loops 33 may be removed by engaging an instrument, such as a finger, between the outer and inner plies 25 and 24 and looping the loose strips of wicking, comprising the upper minor portions of the inner plies plus the outer plies, outwardly, as is proposed on the right-hand side of Fig. 3. This may also be resorted to for the purpose of increasing the rate of diffusion as is indicated above. The stem and wicking assembly may be returned to the bottle when desired by pushing the cap down to engage the neck 14, so as to close the bottle mouth 30.

In Fig. 1 is shown duplicate wicking assemblies mounted on opposite sides of the stem 16. However, the inner and outer plies of the wicking in the right-hand assembly are shown positioned differently than they are in the left-hand assembly. This has been accomplished by means of a small instrument, such as a wire 36, for the purpose of indicating relative dimensions of parts and the foreshortening of the loop 28 with respect to the edge 32 of the cap skirt 11 as may be preferred in a commercial embodiment of the invention.

As shown in the embodiment of Figs. 7 to 10 inclusive, stem means 216 may comprise two somewhat similar pieces or legs 217, 217, preferably rigidly tied together at the top portions thereof, or made integral at a loop 118 receiving therethrough and secured by a rivet or bolt 19 to the cap 10.

The legs 217, 217 of which the stem means 216 may be mainly comprised are preferably resilient throughout their lengths, and each leg is at least resilient in a section of the top portion thereof, such as near the anchorage of the legs to supporting means such as the cap 10, or adjacent points at which the legs are rigidly connected or tied together. For this purpose the legs 217, 217 may be formed of resilient slender rod stock such as steel wire, e. g., fifteen (15) gauge stainless steel wire.

In the embodiment shown in Figs. 7 to 10 inclusive, the legs 217, 217 of the stem means 216 may be formed as sections of a single piece of steel wire bent substantially in its mid-section to form the supporting loop 118 to be fastened to the cap 10. From the loop 118 each leg 217 has a portion 38 which extends downwardly to a point 39 where the wire is bent substantially at right angles to provide a substantially transverse or horizontal portion 40 extending to point 121 where the wire is bent back upon itself to provide another horizontal or transverse portion 41 extending substantially parallel to the portion 39 to provide therebetween a slot 42 for an anchoring purpose to be indicated later. The wire of each leg 217 may then again be bent back upon itself at 43 to form a portion 44 which extends to a point 45, where the wire is then bent downwardly to form an extended section 46 constituting the major portion of the leg. At the lower end of each leg section 46 the wire is again bent at 47 substantially at right angles to form a transversely extending portion 48 terminating at 122 in a reverse bend to cause end portion 49 to extend substantially parallel to the portion 48 providing therebetween another anchoring slot 50.

As viewed in Figs. 7 and 8, it will be seen that legs 217, 217 of the stem means 216 diverge at least from the points of bend at 45, 45 downwardly so that the lower ends thereof at 122, 122 are spaced an appreciable distance apart, either when entirely removed from bottle 15 or when in the lowermost position within the bottle, as viewed in Fig. 7, and that this spacing is appreciably greater than the internal diameter or lateral dimension of the neck 14 and the mouth 30. It will be noted that each leg 217 preferably has its long section 46 bowed outwardly, such as at 51, as viewed in Fig. 7, and further, as viewed from the side in Fig. 11, that section is seen preferably to be bent to zigzag shape to provide certain drag relative to evaporative body or wick means, as will be more fully hereinafter explained.

Elongated flexible strips 123, 123 of porous material, such as wicking, are mounted upon the stem means 216. These elongated strips 123, 123 may be formed as separate pieces, but in the embodiment shown in Figs. 7 to 10 incl., they are provided as parts of an integral piece of wicking which may have one end anchored to the bottom portion of one of the legs 217 at 122 by reception in the slot 50, to be clamped between the leg portions 48 and 49. This lower end of the wicking preferably, but not necessarily, extends beyond the bottom end of leg 217, under discussion, to provide a short end portion 52. The wicking then extends upwardly along the outside of the section 46 of leg 217 from the anchorage at 122 to provide a long outer ply section 125 extending to a point or loop top 128, where the wicking is bent backwardly upon itself to form a relatively short inner ply section 124 that extends to a second anchorage at 121. At 121 the wicking is received in the slot 42 and tightly gripped between the portions 40 and 41 of the leg 217, and from there a quite short section 53 of the wicking extends laterally to the adjacent slot 42 between portions 40 and 41 of the second leg 217, where it is again securely anchored in a similar manner. From the second slot 42 the wicking then extends upwardly to provide a second relatively short section 124 extending to another loop top 128, where the wicking is bent downwardly and back upon itself to provide a second long section 125 extending along the outside of the second leg 217 to the bottom portion of the latter at 122, where it is securely anchored or clamped.

Beyond the bottom portion 122 of the second leg 217 the other end of the wicking extends below the surface 54 of a body 55 of evaporable liquid in the bottle 15 to provide a relatively long section or wick 56, which preferably, though not necessarily, is of sufficient length to reach to the bottom of the bottle when the stem and wick assembly are withdrawn through the neck 14 a maximum distance of adjustment, which assures maximum rate of evaporation or diffusion into the surrounding atmosphere of the evaporable liquid.

It will thus be seen that each strip of wicking 123 extending between the upper anchorage at 121 and the lower anchorage at 122 of each leg 217 provides a loose loop, since that strip of wicking comprising inner ply 124 and outer ply 125 together extending between those anchorages is appreciably longer than the distance between those anchorages along the section 46 of the leg. Those relative lengths should be sufficiently carefully selected so as to assure that top bends at 128, 128 of the two loops of wicking will be located within the elongated bottle neck 14, that is, between the throat of the neck at 31 and the bottle mouh 30 at the top end of the neck, when the stem and wick assembly are in their lowermost position, with the cap 10 having its thread 12 engaged with the thread 13 of the neck, as shown in Fig. 7. This feature is relatively important for the reasons previously indicated.

In operation of the embodiment of the apparatus of the present invention shown in Figs. 7 to 10 inclusive, efficient diffusion of liquid from body 55 thereof in the bottle 15 may be accomplished in a manner similar to that recited above in connection with Figs. 1 to 6 incl. Such diffusion and variation in the rate thereof will be had by unscrewing cap 10 and lifting of the stem and wick assembly thereby up through the bottle neck to a selected diffusing position. If a rather rapid rate of diffusion is desired, the cap 10 may be lifted to the position shown in Fig. 8. As this is done, with withdrawal of the stem means 216 and wicking through the neck, the wet wicking of sections 125, 125 will drag along the inner surface of the neck 14. Further, the sections 46, 46 of the legs 217, 217 will be sprung inwardly toward each other and their zigzag portions at 51, 51 will also provide drag along the inner surfaces of the wicking sections 125, 125, those wicking sections being clamped between the inner surface of the bottle neck and the outwardly bowed sections 46, 46 of the legs.

It will be understood that, in any particular device incorporating features of the present invention, preferably there will be a definite relationship between those two drags, and it has been found that, by a proper proportioning of those drags, as. the stem and wicking assembly is withdrawn to an upward position, the top wicking bends 128, 128 and the short inner ply wicking sections 124, 124, as well as the upper portions of the long outer ply wicking sections 125, 125, will be caused to flare outwardly or laterally, and a bunching of the wicking adjacent the lower anchorages at 122, 122, such as at 57, 57 also will be produced, as illustrated in Fig. 8. As the stem and wicking assembly is lifted, the wicking and stem during the initial portion of travel through the bottle neck 14 move at about equal pace as a result of the compact association of the top portions of the elements of that assembly within the bottle neck. As this assembly is then raised further to a point where the upper wicking anchorages at 121, 121 are above the bottle mouth, the lateral restraint on the top portions or loops of the wicking at 128, 128 is relieved and those loops tend to flare or fall away from the upper portion of the stem means 216 by their own weight. This flaring of the top portions of the wicking loops is additionally attributable to relative proportioning of the drag between the wicking and the inner surface of the neck, on the one hand, and the drag between the wicking and the portions 46, 46 of legs 217, 217 on the other hand.

There is evidence that the flaring of the exposed top portions of the wicking loops and the bunchings at 57, 57, as shown in Fig. 8, are attained to the desired extents when, after passage of the top anchorages for the wicking at 121, 121 above the bottle mouth 30, the drag between the wicking and the inner surface of the neck is made greater to a certain degree than the drag between the leg portions 46, 46 and the wicking. As a result, though the wicking will be withdrawn through the neck with the stem, the rate of withdrawal of the former will become less than that of the latter, thereby reducing the ratio between the length of the outer ply wicking sections 125, 125 and leg portions 46, 46 exposed above the bottle mouth 30, thus causing the top wicking bends 128, 128 gradually to approach the elevation of the anchorages at 121, 121 and producing the bunchings at 57, 57 interiorly of the throat 31 of the neck. In this manner the wicking is to be bunched out at 57, 57 to a lateral over-all dimension of wicking and stem parts at the lower portion of the assembly greater than the interior diameter of the neck 14 so as, as a result, to check withdrawal of the wicking and stem assembly. This bunching at 57, 57 is advantageous since it is of sufficient extent as to cause eventual jamming thereof against the throat 31 to provide stop means limiting further withdrawal of the stem and wicking assembly. The accompanying automatic flaring of the wicking above the neck 14 assures efficient exposure of both inner and outer surfaces of the wicking to the surrounding atmosphere for effective diffusion thereinto of vapor from the evaporable liquid in the bottle.

It will be obvious that the rate of diffusion may be precisely adjusted by the amount of withdrawal of the stem and wicking assembly from the bottle neck and that the greater the withdrawal the greater the rate of diffusion. Further, it will be noted that the initial spread and resiliency of the diverging portions 46, 46 of stem legs 217, 217 and the mentioned drags, will cause the stem and wicking assembly to be held or clamped in any position to which the assembly is withdrawn. Thus, the cross-sectional bulk and dimensions and configuration of the stem and wicking assembly are such as to cause it to be self-supporting in any of a number of positions in the bottle mouth.

The elongated end portion or wick 56 which extends down into the bottle will assure travel by capillary action of the evaporable liquid from the body thereof in the bottle up through the wicking to the portions exposed above the bottle mouth 30 regardless of the quantity of such liquid in the bottle. If desired, the short end portion 52 of the wicking may also be substantially extended to reach to the bottom of the bottle when the stem and wicking assembly are withdrawn to the highest diffusing position. This is not necessary, however, since the wicking of both the loose loops 123, 123 is made integral at 53, thus assuring travel of liquid throughout all of the wicking exposed above the bottle neck. Such travel of the liquid and resultant saturation of all of the wicking may be further assured by so shaping the lower clamping loops at 122, 122 as to cause the end portions 52 and 56 of the wicking to extend toward each other to engagement, as shown in Fig. 8, so that, should the level of the body of liquid 55 in the bottle be eventually lowered to below the end of the short end portion 52 of the wicking, the latter may draw liquid from the wick 56, due to the engagement therebetween, resulting in maintenance of saturation of the left-hand loop 123 as well as the righthand loop with evaporable liquid.

As shown in Figs. 11 and 12, a modified form of the structure may comprise stem means 316, including resilient legs 317, 317, preferably in the form of strips of sheet spring steel, or the like. As shown in this embodiment, the two loose loops of wicking 123, 123 may be provided as separate pieces of wicking each having its upper end 58 fitted with an eyelet 59. As shown in Fig. 11, the upper portions of the stem legs 317, 317 are shaped substantially flat and are held substantially in face engagement by a rivet 60 at 121 which extends through holes in both of the legs and through the two eyelets 59, 59 to anchor the upper ends 58, 58 of the wicking loops 123, 123. The resilient legs 317, 317 formed of sheet spring steel diverge downwardly below the anchorage at 121 and are preferably bowed outwardly, as shown in Fig. 11, similar to that arrangement of the stem legs of the embodiment shown in Figs. 7 to 10 inclusive. The lower anchorages of the wicking loops 123, 123 at 122, 122 may be provided in any suitable manner, such as by shaping the lower ends of the leg strips 317, 317 to form pointed barbed heads 61, 61 which may be readily pierced through the wicking to anchor it. In this embodiment, as previously suggested, where the two loose loops of wicking 123, 123 are formed as separate parts, it may be desirable to extend both bottom ends of the wicking a considerable distance below both of the lower anchorages at 122, 122 so that capillary action in each separate piece of wicking will assure saturation with the liquid from the body 55 thereof in the bottle 15 at all times. Accordingly, the lower ends of both of the loops 123, 123 may be extended below anchorages at 122, 122 each to provide a wick 56.

In Fig. 13 is shown a further modified form of the invention which, with respect to the stem means, is similar to that proposed in Figs. 11 and 12, but the upper ends 58, 58 of the wicking loops 123, 123 are extended downwardly past the upper anchorages at 121 to the lower anchorages at 122, 122 to provide longer inner plies 224, 224, each extending on the outside of the major portion 46 of its adjacent leg 317 from the upper anchorage at 121 to the lower anchorage at 122. This increases the area of the exposed surfaces of the wicking when the stem and wick assembly are withdrawn through the bottle neck to diffusing position. It will be noted that in any structure similar to that proposed in Fig. 13 all other features described above in connection with Figs. 7 to 12 incl., including the flaring of the loose loops, the retention of the upper portions therein within the neck when the stem and wicking assembly is moved to its lowermost position with the bottle closed by the cap 10, and the bunching at 57, 57 to limit withdrawal, are all characteristic of that structure.

In Figs. 14 and 15 is shown a modified form of the structure shown in Figs. 7 to 10 inclusive. In this device the upper portions 138, 138 of legs 417, 417 are arranged in divergence so that there is gradual divergence throughout the entire lengths of the legs from the anchorage thereof at the cap, such as by means of rivet 19, to the lower anchorages at 122, 122. This brings about an appreciable spacing of the legs at the top anchorages 121, 121, providing therebetween a section 153 of wicking which is of an appreciable length. In order to adapt such a structure to a vessel of the type having a restricted mouth, such as a bottle 15 having a relatively small neck 14, the portions of the steel wire legs 417, 417 which are reversely bent to provide the top anchorages at 121, 121 are shaped as shown in Fig. 15 with the transversely extending portions 140, 141 and 144, between the points 39 and 45, being shaped arcuately to adapt them to the cylindrical shape of the inner wall of the bottle neck 14. In other respects the structure shown in Figs. 14 and 15 is similar to the cap, stem and wicking assembly shown in Figs. 7 to 10 inclusive, and its operation, when used with a filled bottle, such as 15, will be similar to that described above in connection with that embodiment.

As previously intimated, a stem and wicking assembly of a type similar to those shown in Figs. 1 to 6 incl., can be altered in a ready and simple manner with omission of a large part of each wicking inner ply 24, with suitable provision for secure anchorage thereof to the stem means at 21. As suggested, such means may comprise a rivet, bolt, or other suitable fastening means. Such a structure is shown by way of example in Figs. 16 and 17. As therein shown, the stem means 516 may comprise a single flat piece or strip 517 of metallic or other somewhat rigid or resilient material and, of course, can be of any other desired and suitable cross-sectional shape. Anchorage of the upper end of stem means 516 to the underside of cap 10 can be accomplished in many ways, such as by providing rivet 19 as a reduced portion of the upper end of stem element 517 or by bending the latter laterally and aperturing to receive a separate rivet. The pair of laterally-flarable loops of wicking 223, 223 may be mounted on opposite sides of stem means 516 by providing as an upper anchorage at 121 a through rivet 60 and washers 62, 62. By way of example, the upper ends 58, 58 of the wicking loops 223, 223 are anchored to the stem element 517 by overlaying each with one of the washers 62, 62, aligning the holes therein with holes in the two strips of wicking and a hole in the stem element at 121, placing headed rivet 60 in the aligned holes and fastening the parts together by peening over the end of the rivet shank, as shown in Fig. 16.

The strips of wicking constituting laterally-flarable loops 223, 223 are anchored to the lower end of stem element at 222 by means similar to that employed at anchorage 121 in Fig. 16, and it will be noted that each strip of wicking extending between the anchorages at 121 and 222 is appreciably longer than the straight line distance between those two anchorages, thereby providing a laterally-flarable loop of wicking 223 on each side of the stem means. Each of those loops 223 is made up of an outer ply 25 longer than the distance between the two anchorages 121 and 222, extending up from the latter to a top bend at 28, and shorter inner ply 324 extending down from that top bend to the upper anchorage 121. That important feature is characteristic of all of the embodiments of the invention herein disclosed, as well as of the devices shown and described in our copending application Serial No. 676,521, filed June 13, 1946.

Although the wicking and stem assembly of Figs. 16 and 17 preferably has the laterally-flarable loop of wicking 223 duplicated on opposite sides of the stem means 516, of course, as previously pointed out, only one such loop need be employed to produce an operative device. Further, either one or both of the depending wicks 29, 29 may be omitted, if desired, or provided as separate elements and joined to the flarable loops by any suitable means, such as stitching, stapling, or by means of the lower anchorage means at 222. Thus joining of a depending wick to the wicking in a loop may be attained by making them integral or by attaching them together if formed as separate elements.

It will thus be seen that the objects set forth above and those made apparent from the preceding description, among others, are efficiently attained in accordance with the present invention, and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A liquid diffuser comprising, in combination, a vessel having a mouth of a certain cross-sectional area, elongated stem means extending down through the mouth into said vessel, a pair of anchoring means on said stem means located a certain distance apart, and a strip of wicking anchored to said stem means at spaced points by said pair of anchoring means with the length of said strip between said pair of anchoring means being appreciably longer than the distance between the latter to provide a loop of wicking capable of being flared laterally exteriorly of the vessel mouth when said stem means is partially withdrawn from the latter, said stem means and wicking loop constituting parts of a diffuser assembly of such configuration and bulk as to be self-supporting in the vessel mouth when withdrawn to a diffusing position.

2. In a diffuser assembly for evaporating liquids contained within a vessel having a mouth of a certain cross-sectional area, the combination comprising an elongated supporting means, upper and lower wicking anchoring means carried by said supporting means and spaced apart a predetermined distance, and a strip of wicking anchored to said supporting means by said upper and lower anchoring means with the length of said strip extending between said anchoring means being appreciably longer than the distance between the latter to provide a laterally-flarable loop, said diffuser assembly being of such cross-sectional bulk and configuration with respect to the cross-sectional area of the vessel mouth as to be self-supporting in elevated position in the mouth.

3. A liquid diffuser comprising, in combination, a vessel having a throat and outwardly thereof a restricted mouth, and a diffuser assembly comprising an elongated stem means extending down through the mouth and throat into said vessel, a pair of anchoring means on said stem means located a certain longitudinal distance apart, and a strip of wicking anchored to said stem means at one point by one of said pair of anchoring means and at another point by the other of said pair of anchoring means with the length of that strip of wicking between said pair of anchoring means having no intervening point of anchorage to said stem means and being appreciably longer than the distance between said anchoring means to provide a loose loop of wicking to permit upon withdrawal of said stem means provision of a flared loop of wicking exteriorly of the vessel for increasing the rate of diffusion, said diffuser assembly being of such configuration and bulk as to be self-supporting in the mouth in a plurality of adjusted diffusing positions.

4. In a wick assembly for evaporating fluids contained within a vessel which is provided with an open neck at its upper end, the combination of an elongated wick-supporting member, wick-engaging portions carried by the member adjacent upper and lower ends thereof, and a wick, the upper section of the wick being supported while under tension between such wick-engaging portions, the resulting wick assembly being of such cross-sectional bulk and configuration as to be self-supporting in elevated position through frictional contact between the wick and the neck of the vessel, the lower section of the wick being of sufficient length to project into the field when the wick assembly is in such elevated position.

5. A liquid diffuser comprising, in combination, a vessel having a restricted mouth, elongated stem means extending down through the mouth into said vessel, upper anchoring means on said stem means located in the vicinity of the mouth and additional anchoring means located a considerable distance from the upper anchoring means down said stem means, and at least a pair of elongated strips of wicking mounted on said stem means with one on one side thereof and the other on the opposite side thereof, each of that pair of strips of wicking being anchored to said stem means at one point by the upper anchoring means and at another point by the lower anchoring means with the length of each of those strips of wicking on each side of said stem means having no intervening point of anchorage to the latter and being appreciably longer than the longitudinal distance between the upper and lower anchoring means to provide on each side of said stem means a loose loop of wicking, said stem means and aggregate wicking extending through the mouth upon withdrawal being of such configuration and bulk as to cause the wicking to drag against the vessel structure defining the mouth when said stem and wicking assembly is withdrawn to be substantially self-supporting in the mouth in a plurality of adjusted diffusing positions and ultimately to provide jamming bunching of wicking interiorly of the vessel inward of the mouth when the lower anchoring means is pulled up toward the mouth.

6. A liquid diffuser comprising, in combination, a vessel having a neck providing a mouth; and a diffuser assembly comprising elongated stem means extending down through said neck into said vessel, a pair of longitudinally spaced-apart anchoring means on said stem means, and a strip of wicking anchored to said stem means on one side thereof at one point by one of said pair of anchoring means and at another point by the other of said pair of anchoring means with the length of that strip of wicking between said pair of anchoring means having no intervening point of anchorage to said stem means and being appreciably longer than the distance between said anchoring means to provide a loose loop of wicking to permit upon withdrawal of said stem means from said neck provision of a flared loop of wicking exteriorly of the vessel for increasing the rate of diffusion, the loose loop of wicking being substantially duplicated on the opposite side of said stem means, said diffuser assembly being of such configuration and bulk as to be substantially self-supporting on said vessel in a plurality of adjusted diffusing positions.

7. A liquid diffuser comprising, in combination, a vessel having an elongated neck providing a mouth at the outward end thereof and a throat at the inward end thereof, a removable closure for the mouth, stem means mounted on said closure and extending down through said neck into said vessel, a strip of wicking looped back upon itself to provide a loop top and inner and outer plies both depending from the loop top, and a pair of longitudinally spaced-apart anchoring means on said stem means with the bottom one securing said outer ply to one side of said stem means and the top one securing the inner ply to the same side of said stem means at a point appreciably below the loop top with the resulting length of wicking which extends between said pair of anchoring means being appreciably longer than the distance therebetween to hang loosely between said pair of anchoring means, the top of the loop of wicking being so extended beyond the top anchoring means toward said closure sufficiently to assure location thereof in the neck between its throat and mouth when said closure is seated in closing position, the length of said inner ply above the top anchoring means being such that the distance between said top anchoring means and any point on the top of the loop is substantially no longer than the distance between that anchoring means and any point on the bottom edge of said closure, the resulting stem and wicking diffuser assembly being of such configuration and bulk as to be substantially self-supporting in the mouth in a plurality of adjusted diffusing positions.

8. A liquid diffuser comprising, in combination, a vessel having a neck providing a mouth, a removable closure for the mouth, elongated stem means mounted on said closure and extending down through the mouth and neck into said vessel, upper anchoring means on said stem means located in the vicinity of said neck and additional anchoring means located a considerable distance from the upper anchoring means down said stem means, and at least a pair of elongated strips of wicking mounted on said stem means with one on one side thereof and the other on the opposite side thereof, each of that pair of strips of wicking being anchored to said stem means at one point by the upper anchoring means and at another point by the lower anchoring means wtih the length of each of those strips of wicking on each side of said stem means having no intervening point of anchorage to the latter and being appreciably longer than the longitudinal distance between the upper and lower anchoring means to provide on each side of said stem means a loose loop of wicking, said stem means and aggregate wicking extending through the neck and mouth upon withdrawal being of such configuration and bulk as to cause the wicking to drag against the inner wall of the neck when said stem and wicking assembly is withdrawn to be substantially self-supporting in the neck in a plurality of adjusted diffusing positions and ultimately to provide jamming bunching of wicking interiorly of the vessel at the throat of the neck when the lower anchoring means is pulled up toward the throat, each of said loops of wicking having its top portion extended beyond the upper anchoring means toward said closure with the length of the loop of wicking being such that the distance between said upper anchoring means and any point on the top portion of the loop is substantially no longer than the distance between that anchoring means and any point on the bottom edge of said closure.

9. A liquid diffuser comprising, in combination, a vessel having a neck providing a mouth, elongated stem means extending down through said neck into said vessel, a strip of wicking looped back upon itself to provide a loop top and inner and outer plies both depending from the loop top, a pair of longitudinally spaced-apart anchoring means on said stem means with the bottom one securing said outer ply to one side of said stem means and the top one securing the inner ply to the same side of said stem means at a point appreciably below the loop top with the resulting length of wicking which extends between said pair of anchoring means being appreciably longer than the distance therebetween to hang loosely between said pair of anchoring means, and a wick joined to said strip depending from said stem means and of such length as to reach the bottom of said vessel when said stem means is withdrawn to maximum evaporating position with its bottom end in the vicinity of said neck, the resulting stem and wicking diffuser assembly being of such configuration and bulk as to be substantially self-supporting in the mouth in a plurality of adjusted diffusing positions.

10. A liquid diffuser comprising, in combination, a vessel having an elongated neck providing a mouth at the outward end thereof and a throat at the inward end thereof, a removable closure for the mouth, elongated stem means mounted on said closure and extending down through said neck into said vessel, a pair of wicking assemblies located on opposite sides of said stem means with each comprising a strip of wicking looped back upon itself to provide a loop top and inner and outer plies depending from the loop top, lower anchoring means on said stem means securing the outer ply of each of said wicking assemblies to said stem means, top anchoring means on said stem means longitudinally spaced from said lower anchoring means and securing the inner ply of each of said wicking assemblies to said stem means at a point appreciably below the loop top of the strip of wicking in that wicking assembly, the resulting length of wicking in each of said wicking assemblies which extends between the top and lower anchoring means being appreciably longer than the distance therebetween to hang loosely between those anchoring means, the top of the loop of wicking in each of said wicking assemblies being so extended beyond the top anchoring means toward said closure sufficiently to assure location thereof in the neck between its throat and mouth when said closure is seated in closing position, the length of each of said inner plies above the top anchoring means being such that the distance between the latter and any point on either of the two loop tops is no longer than the distance between that anchoring means and any point on the bottom edge of said closure, and a wick joined to at least one of said strips of wicking in said wicking assemblies depending from said stem means and of such length as to reach the bottom of said vessel when said stem means is withdrawn to maximum evaporating position with its bottom end in the vicinity of said neck, the resulting stem and wicking diffuser assembly being of such configuration and bulk as to be substantially self-supporting in the mouth in a plurality of adjusted diffusing positions.

11. A diffuser assembly comprising, in combination, a vessel having a neck providing a mouth, elongated stem means extending down through said neck into said vessel, a pair of strips of wicking each looped back upon itself to provide a loop top and inner and outer plies depending from the loop top, and a pair of longitudinally spaced-apart anchoring means on said stem means with the bottom one securing both outer plies to said stem means on opposite sides thereof and with the top anchoring means securing both the inner plies to opposite sides of said stem means, the resulting length of wicking on each side of said stem means which extends between said pair of anchoring means being appreciably longer than the distance therebetween to hang loosely between said pair of anchoring means, said stem means being of such cross-sectional dimension and the wicking on opposite sides thereof being of such thickness and width as to cause the diffuser assembly when the wicking is wet frictionally to grip the inner walls of the neck to hold such assembly in desired adjusted position while permitting forced sliding to other positions and with the wicking having longitudinally-extending folds in those portions confined within the neck serving as vapor lock-preventing vents.

12. A liquid diffuser comprising, in combination, a vessel having a mouth, a substantially rigid elongated stem extending down through the mouth into said vessel, a strip of wicking looped back upon itself to provide an inner ply and an outer ply, and a pair of longitudinally spaced-apart anchoring means on said stem securing a lower portion of said inner ply to one side of said stem in a relatively taut condition between said pair of anchoring means, said outer ply being secured to the same side of said stem by the bottom anchoring means of said pair and joined at the top of the loop of wicking to an upper portion of said inner ply above the top anchoring means of said pair with the top of the loop being extended beyond the top anchoring means whereby the wicking in said outer ply and the top portion of said inner ply hangs loosely between said pair of anchoring means, the resulting stem and wicking diffuser assembly being of such configuration and bulk as to be substantially self-supporting in the mouth in a plurality of adjusted diffusing positions.

13. A liquid diffuser comprising, in combination, a vessel having a neck providing a mouth, a removable closure for the mouth, a substantially rigid elongated stem mounted on said closure and extending down through said neck into said vessel, a strip of wicking looped back upon itself to provide an inner ply and an outer ply, and a pair of longitudinally spaced-apart anchoring means on said stem securing a lower portion of said inner ply to one side of said stem in a relatively taut condition between said pair of anchoring means, said outer ply being secured to the same side of said stem by the bottom anchoring means of said pair and joined at the top of the loop of wicking to an upper portion of said inner ply above the top anchoring means of said pair with the top of the loop being extended beyond the top anchoring means toward said closure whereby the wicking in said outer ply and the top portion of said inner ply hangs loosely between said pair of anchoring means, the length of the top portion of said inner ply above the top anchoring means being such that the distance between said top anchoring means and any point on the top of the loop is substantially no longer than the distance between that anchoring means and any point on the bottom edge of said closure, the resulting stem and wicking diffuser assembly being of such configuration and bulk as to be substantially self-supporting in the mouth in a plurality of adjusted diffusing positions.

14. A liquid diffuser comprising, in combination, a vessel having a neck providing a mouth, elongated stem means extending down through said neck into said vessel, a strip of wicking looped back upon itself to provide an inner ply and an outer ply, and a pair of longitudinally spaced-apart anchoring means on said stem means with the bottom one securing both plies to one side of said stem means and the top one securing the inner ply to the same side of said stem means with relatively no slackness of said inner ply between said pair of anchoring means, the top of the loop of wicking being extended beyond the top anchoring means whereby said outer ply hangs loosely between said pair of anchoring means, said wicking structure being duplicated on opposite sides of said stem means, said stem means being of such cross-sectional dimension and said plies of wicking being of such thickness and width as to cause the diffuser assembly when said wicking is wet frictionally to grip the inner walls of the neck to hold such assembly in desired adjusted position while permitting forced sliding to other positions.

WILLIAM H. WHEELER.
LEONARD B. WAMNES.

REFERENCES CITED

The following references are of record in the file of this patent:

UNITED STATES PATENTS

| Number | Name | Date |
|---|---|---|
| 337,164 | Kidney | Mar. 2, 1886 |
| 488,530 | Roberts | Dec. 20, 1892 |
| 525,646 | Cox | Sept. 4, 1894 |
| 1,329,143 | Rogers | Jan. 27, 1920 |
| 2,243,752 | Dunaway | May 27, 1941 |
| 2,362,903 | Keim | Nov. 14, 1944 |
| 2,376,046 | Gelfand | May 15, 1945 |